Aug. 15, 1944.   W. E. SWIFT, JR   2,355,686
TORQUE AMPLIFIER
Filed Sept. 25, 1943

INVENTOR.
Willard E. Swift Jr.
BY C. E. Herrstrom +
H. E. Thibodeau
ATTORNEYS.

Patented Aug. 15, 1944

2,355,686

UNITED STATES PATENT OFFICE 2,355,686

TORQUE AMPLIFIER

Willard E. Swift, Jr., Worcester, Mass.

Application September 25, 1943, Serial No. 503,831

11 Claims. (Cl. 74—388)

(Granted under the act of March 3, 1883, as amended April 30, 1928; 370 O. G. 757)

The invention described herein may be manufactured and used by or for the Government for governmental purposes, without the payment to me of any royalty thereon.

The present invention has for its object a torque amplifier wherein a high power input may be controlled with respect to the output torque by means of a finely variable, manually operable speed reduction device. Another object of the invention is to provide such a device wherein the direction as well as the torque of the final driven shaft may be regulated.

The driving train to the driven shaft is established through a spring coiled around the shaft and at times loosely received in a drive gear. One end of the spring is anchored to the shaft and the other end frictionally received in a member which also loosely surrounds the shaft. This member is rotated from a variable speed device to drag the spring and, in one direction, expand it into contact with the gear. In this condition the spring is a driving connection between the gear and the shaft until the shaft exceeds the speed of the dragging member, whereupon the connection is interrupted. The connection is restored when the speed of the shaft becomes less than that of the dragging member. This cycle has a comparatively high frequency. Each cycle includes as one phase an impulse of driving force applied to the shaft. The rotation of the shaft is made substantially uniform by a device such as a flywheel or by operating parts having a flywheel effect.

A dual system of springs and driving gears is provided, the springs being mounted in such a manner that rotation of the dragging member in one direction leaves one of the springs idle. On reversal of the variable speed device and the dragging member actuated thereby, the condition of the springs is reversed. Thus, the driven shaft may be driven in either direction.

An illustrative embodiment of the invention is disclosed in the following description and in the accompanying drawing in which.

Figure 1:
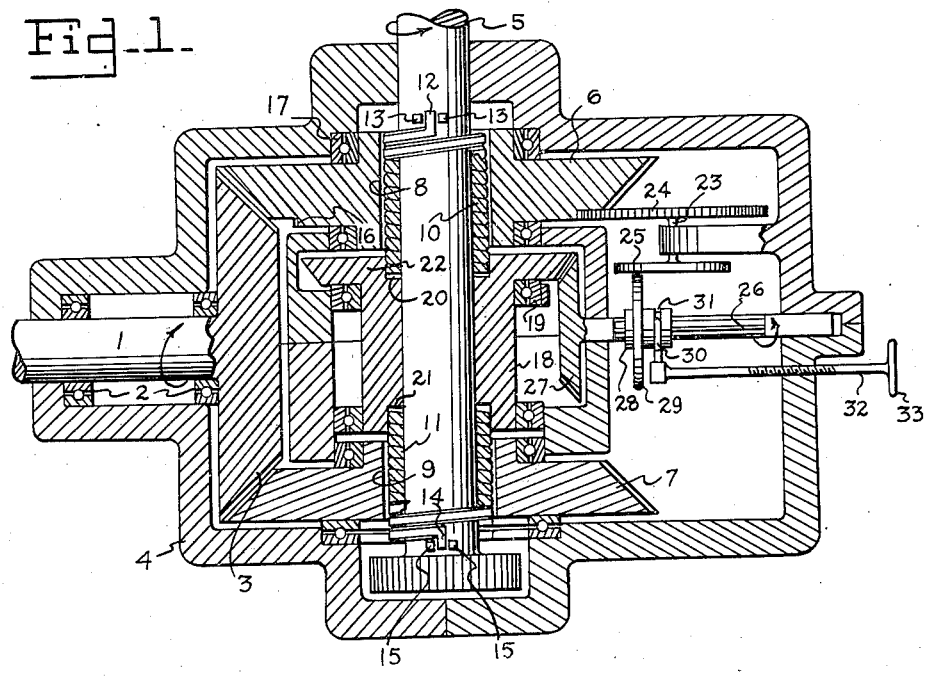
Figure 1 is a cross section of the device.
Figure 2:
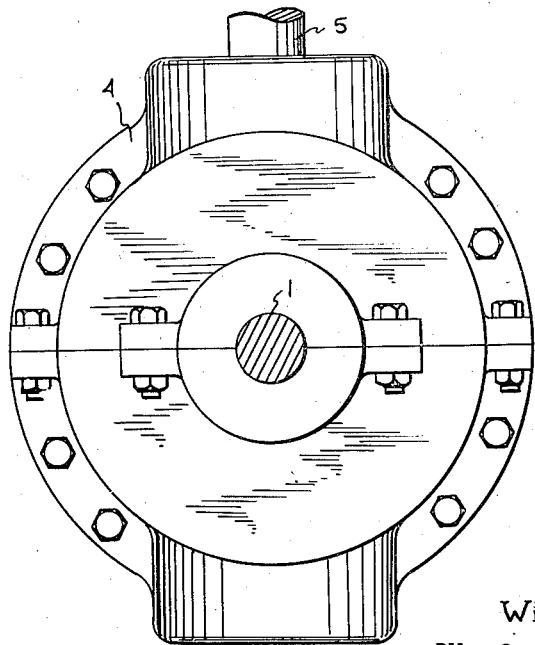
Figure 2 is an elevation.

A drive shaft 1 driven from any suitable source and supported in bearings 2 carries a bevel gear 3. The bearings are mounted in a suitably shaped housing 4, and it will be understood that all bearings hereinafter mentioned are properly supported in the same housing.

A driven shaft 5 is mounted in the housing at right angles to the shaft 1. On the shaft are loosely mounted two parallel bevel gears 6 and 7 meshing with the gear 3 at diametrically opposite points. The gears are formed respectively with openings 8 and 9 around the shaft and receive coil springs 10 and 11 surrounding the shaft and having a clearance of .001 to .003 inch within their recesses 8 and 9. The springs are wound in the same direction but have opposite ends attached to the shaft. For example, the upper end of the spring 10 is bent lengthwise at 12 and received between a pair of lugs 13 on the shaft, while the lower end of the spring 11 is bent lengthwise at 14 and received between a pair of similar lugs 15. A spur gear 16 is formed with or attached to the gear 6 for a purpose that will presently appear. The gears 6 and 7 are journalled in and positioned by suitable bearings 17 mounted in the housing 4.

Between the springs 10 and 11 the shaft 5 is loosely surrounded by a sleeve 18 supported in suitable bearings 19. The ends of the sleeve are formed with cavities 20 and 21 receiving the inner ends of the springs 10 and 11 in frictional engagement with the walls of the cavity. For example, the diameter of each cavity may be .001 to .002 inch smaller than the outside diameter of the spring received therein. One end of the sleeve is formed with a gear 22 for a purpose that will presently appear.

A countershaft 23 is journalled in the housing 4 and carries the gear 24 meshing with the gear 16. A friction disk 25 is carried on the lower end of shaft 23.

Beneath the disk, a longitudinally splined shaft 26 is journalled in the housing and carries a gear 27 meshing with the gear 22. On the shaft 26 is splined a sleeve 28 formed with a disk 29 in peripheral engagement with the disk 25. A shifting fork 30 is received in a groove 31 formed in the sleeve 28 and has a threaded stem 32 screwed in housing and fitted with an operating handle 33.

In the operation of the device, the gears 6 and 7 are in rotation simultaneously with the drive gear 1, and a light drive is transmitted through the gears 16, 24 and disks 25, 29 to the shaft 26 and gear 27. The speed of the latter varies with the distance of the disk 29 from the center of disk 25 and reverses when the disk 29 crosses the center of disk 25. The sleeve 18 is obviously driven from the gear 27 through the gear 22.

For purposes of description, it may be assumed that the parts are rotating in the direction indicated by the arrows, the shaft 5 being momentarily stationary. The frictional drag on the lower end of the spring 10 against the anchored end 12 expands the spring into engagement with the rotating gear 6. The gear 6 thus momentarily rotates the shaft 5 through the spring 10 as a connecting member and becomes disengaged from the spring when the speed of the shaft 5 exceeds that of the gear 22. At that time there is no longer a drag on the lower end of the spring. Consequently the spring contracts and interrupts the driving connection between the gear 6 and the shaft until the cycle is repeated when the speed of the shaft 5 drops below that of the gear 22. These cycles are of relatively high frequency and result in a substantially uniform speed of the shaft 5 as determined by the position of the sleeve 28. During this operation, the spring 11 is merely tightened on the shaft 5, so that the gear 7 merely overruns, and spring 11 slips in pocket 21.

On reverse rotation a similar overrunning occurs with respect to the gear 6. The spring 11, however, is expanded intermittently to establish a drive between the gear 7 and the shaft 5 in the manner already described in detail.

The mechanism is well suited for installation where the desideratum is the delicate and accurate control of a high power input rather than efficiency in transmitting power. As an example, the mechanism may be used to traverse a gun or rotate the turret of a combat tank. In such case the shaft 5 carries a take-off gear 34 that meshes with a ring gear carried by the body of the tank. Manual adjustment of the handle 33 regulates the high torque applied at the gear 3 and increased through the described gear train that determines the speed of the shaft 5.

While a specific embodiment of the invention has been illustrated and described, it is intended that various alterations in the details of construction may be made without departing from the invention as indicated by the scope of the appended claims.

What I claim is:

1. A torque amplifier comprising drive and driven shafts, a gear loosely mounted on said driven shaft and geared to said drive shaft, a member loosely mounted on said driven shaft, a coil spring surrounding said driven shaft and received loosely in said gear, said spring having one end anchored to said driven shaft and the other end frictionally connected to said member, and a variable speed device having its output side geared to said member.

2. A torque amplifier comprising drive and driven shafts, a gear loosely mounted on said driven shaft and geared to said drive shaft, a member loosely mounted on said driven shaft, a coil spring surrounding said driven shaft and received loosely in said gear, said spring having one end anchored to said driven shaft and the other end frictionally connected to said member, and a variable speed device having its output side geared to said member.

3. A torque amplifier comprising drive and driven shafts, a gear loosely mounted on said driven shaft and geared to said drive shaft, a second gear loosely mounted on said driven shaft, a coil spring surrounding said driven shaft and received loosely in the first gear, said spring having one end anchored to said driven shaft and the other end frictionally connected to the second gear, and a variable speed device having its output side geared to the second gear.

4. A torque amplifier comprising drive and driven shafts, a pair of gears loosely mounted on said driven shaft and geared to said drive shaft, a member loosely mounted on said driven shaft between said gears, a pair of coil springs surrounding said driven shaft and loosely received in said gears, each of said springs having one end anchored to said driven shaft and the other end frictionally connected to said member, said springs being mounted to be respectively wound and unwound on rotation of said member in a given direction, and a variable speed device having its output side geared to said member.

5. A torque amplifier comprising drive and driven shafts, a pair of gears loosely mounted on said driven shaft and geared to said drive shaft, a member loosely mounted on said driven shaft between said gears, a pair of coil springs surrounding said driven shaft and loosely received in said gears, each of said springs having one end anchored to said driven shaft and the other end frictionally connected to said member, said springs being mounted to be respectively wound and unwound on rotation of said member in a given direction, and a variable speed device having its output side driving said member.

6. A torque amplifier comprising drive and driven shafts, a gear loosely mounted on said driven shaft and geared to said drive shaft, a member loosely mounted on said driven shaft, a coil spring surrounding said driven shaft and received loosely in said gear, said spring having one end anchored to said driven shaft and the other end frictionally connected to said member, a friction disk geared to said drive shaft, a splined shaft geared to said member, a sleeve slidably mounted on said splined shaft, and another disk carried by said sleeve and frictionally engaging the first disk.

7. A torque amplifier comprising drive and driven shafts, a gear loosely mounted on said driven shaft and geared to said drive shaft, a member loosely mounted on said driven shaft, a coil spring surrounding said driven shaft and received loosely in said gear, said spring having one end anchored to said driven shaft and the other end frictionally connected to said member, a friction disk geared to said gear, a splined shaft geared to said member, a sleeve slidably mounted on said splined shaft, and another disk carried by said sleeve and frictionally engaging the first disk.

8. A torque amplifier comprising drive and driven shafts, a pair of gears loosely mounted on said driven shaft and geared to said drive shaft, a member loosely mounted on said driven shaft between said gears, a pair of coil springs surrounding said driven shaft and loosely received in said gears, each of said springs having one end anchored to said driven shaft and the other end frictionally connected to said member, said springs being mounted to be respectively wound and unwound on rotation of said member in a given direction, a friction disk geared to said drive shaft, a splined shaft geared to said member, a sleeve slidably mounted on said splined shaft, and another disk carried by said sleeve and frictionally engaging the first disk.

9. A torque amplifier comprising drive and driven shafts, a pair of gears loosely mounted on said driven shaft and geared to said drive shaft, a member loosely mounted on said driven shaft between said gears, a pair of coil springs surrounding said driven shaft and loosely received in said gears, each of said springs having one end anchored to said driven shaft and the other end frictionally connected to said member, said springs being mounted to be respectively wound and unwound on rotation of said member in a given direction, a friction disk geared to one of said gears, a splined shaft geared to said member, a sleeve slidably mounted on said splined shaft, and another disk carried by said sleeve and frictionally engaging the first disk.

10. A torque amplifier comprising drive and driven shafts, a pair of gears loosely mounted on said driven shaft and geared to said drive shaft, a member loosely mounted on said driven shaft between said gears, a pair of coil springs surrounding said driven shaft and loosely received in said gears, each of said springs having one end anchored to said driven shaft and the other end frictionally connected to said member, said springs being mounted to be respectively wound and unwound on rotation of said member in a given direction, a gear formed on said member, and a variable speed device having its output side geared to the last named gear.

11. A torque amplifier comprising a constant speed input shaft, a variable speed output shaft, an input gear on said input shaft, oppositely rotating drive gears surrounding the output shaft, helical springs between said output shaft and said drive gears, a control member frictionally engaging said springs, said springs being disposed to connect said drive gears and said output shaft on being wound or unwound by said control member, and light duty, variable speed, reversible driving means for driving said control member in either direction.

WILLARD E. SWIFT, JR.